United States Patent

Babjak et al.

[11] Patent Number: 5,824,283
[45] Date of Patent: Oct. 20, 1998

[54] PROCESS FOR PRODUCING NICKEL HYDROXIDE FROM ELEMENTAL NICKEL

[75] Inventors: Juraj Babjak; Victor Alexander Ettel, both of Mississauga; Stephen Joseph Baksa, Oakville; Raymond Augustus Bradford, Woodbridge, all of Canada

[73] Assignee: Inco Limited, Toronto, Canada

[21] Appl. No.: 847,715

[22] Filed: Apr. 28, 1997

[51] Int. Cl.$^6$ ............................ C01B 13/14; C01G 53/00
[52] U.S. Cl. ............................................ 423/592; 423/141
[58] Field of Search ..................................... 423/141, 592

[56] References Cited

U.S. PATENT DOCUMENTS

| | | | |
|---|---|---|---|
| 1,135,785 | 4/1915 | Frasch | 423/592 |
| 3,440,099 | 4/1969 | Okinaka | 136/6 |
| 3,657,013 | 4/1972 | Melin | 136/28 |
| 4,053,578 | 10/1977 | Hill et al. | 423/592 |
| 4,481,128 | 11/1984 | Jackovitz et al. | 252/182.1 |
| 5,281,494 | 1/1994 | Ettel et al. | 429/223 |
| 5,447,707 | 9/1995 | Babjak et al. | 423/592 |
| 5,545,392 | 8/1996 | Babjak et al. | 423/592 |
| 5,569,444 | 10/1996 | Blanchard et al. | 423/594 |

FOREIGN PATENT DOCUMENTS

| | | |
|---|---|---|
| 2133906 | 4/1995 | Canada . |
| 2137762 | 6/1995 | Canada . |
| 2162215 | 5/1996 | Canada . |
| 2162216 | 5/1996 | Canada . |
| 3129189 | 2/1983 | Germany . |
| 3513119 | 10/1986 | Germany . |

OTHER PUBLICATIONS

Marioka et al., "Studies on the Ammonia Pressure Leaching of Metallic Nickel and Copper Powders," Trans. Japan Institute of Metals, vol. 12(1971) pp. 197–205, No Month.

Shimakage et al., "Fundamental studies on the ammonia pressure leaching of metallic nickel powder," Institution of Mining and Metallurgy, vol. 80, (Dec. 1971) pp. C228–C234.

Translation PTO 96–2274, Xia et al., "A Study of the Kinetics of the Dissolution of Ni in Ammiacal Solutions," Jinshu Xuebao, vol. 16, No. 3, Sep. 1980, pp. 290–300.

Primary Examiner—Steven Bos
Attorney, Agent, or Firm—Blake T. Biederman; Edward A. Steen

[57] ABSTRACT

This process produces nickel hydroxide from elemental nickel. Introducing elemental nickel into at least a 4N aqueous ammonia solution forms a mixture. Activating the nickel powder of this mixture allows the nickel to react with oxygen in the solution. This results in the dissolving of the nickel, producing a loaded solution containing nickel and hydroxyl ions. The redox potential of the solution remains negative during the dissolution of nickel. Distilling the loaded solution to vaporize the aqueous ammonia solution results in the precipitating of nickel hydroxide.

17 Claims, 2 Drawing Sheets

PROCESS FOR PRODUCING NICKEL HYDROXIDE FROM ELEMENTAL NICKEL

TECHNICAL FIELD

This invention relates to a process for producing nickel hydroxide from nickel powders.

BACKGROUND OF THE INVENTION

Nickel hydroxide is a very important material in the manufacture of positive nickel electrodes for alkaline batteries. The electric vehicle market demands a low-cost-high-performance battery to facilitate the widespread acceptance of electric vehicles. For example, nickel cadmium and metal hydride batteries provide good performance at a reasonable cost. Lowering the cost of nickel hydroxide however, could significantly increase the cost effectiveness of electric vehicles using these batteries.

Most processes for making nickel hydroxide rely on its caustic precipitation from nickel sulfate solutions containing an ammonia/ammonium salt. These processes generate large volumes of waste water however, since they produce approximately 1.5 kg of sodium sulfate for each kilogram of nickel hydroxide produced. Thus conventional caustic precipitation techniques create the environmental problem of disposing of large quantities of this by-product. The cost of properly disposing of this by-product adds significant costs to the price of nickel hydroxide.

Canadian Patent Application No. 2,137,762, describes a relatively pollutant-free process for precipitating nickel hydroxide. This process first prepares a "reactive" nickel hydroxide by anodically oxidizing the metallic nickel. A strong ammonia/NaCl solution then dissolves the nickel hydroxide to generate a nickel-hexammine-chloride intermediate product. Subjecting this intermediate to distillation in a loop reactor decomposes the nickel-hexammine into nickel hydroxide.

Recently developed processes for making nickel hydroxide minimize or eliminate these waste water disposal problems. Two of these processes, described in U.S. Pat. Nos. 5,447,707 ('707) and 5,545,392 ('392), convert elemental nickel powder directly into nickel hydroxide. In the '707 process, nickel powder oxidizes in an ammonia/ammonium nitrate solution and simultaneously precipitates nickel hydroxide in a one-step operation. In this process, the reduction of nitrate ions into ammonia oxidizes the metallic nickel to drive the reaction. In the '392 process, nickel powder oxidizes in an ammonia/ammonium salt solution. The careful control of oxygen in this process maintains a reducing potential that simultaneously oxidizes nickel and precipitates a nickel hydroxide product. Both processes are closed-loop processes that do not generate any liquid waste by-product.

It is an object of the invention to produce a pollution-free-closed-loop process for producing nickel hydroxide.

It is a further object of this invention to provide a low-cost process for producing battery grade nickel hydroxide.

It is a further object of this invention to increase the control of the final crystallinity of nickel hydroxide.

It is a further object of this invention to provide a method capable of incorporating metal additives for improved battery performance.

SUMMARY OF THE INVENTION

This process produces nickel hydroxide from elemental nickel. Introducing elemental nickel into at least a 4N aqueous ammonia solution forms a mixture. Activating the nickel powder of this mixture allows the nickel to react with oxygen in the solution. This results in the dissolving of the nickel, producing a loaded solution containing nickel and hydroxyl ions. The redox potential of the solution remains negative during the dissolution of nickel. Distilling the loaded solution to vaporize the aqueous ammonia solution results in the precipitating of nickel hydroxide.

DESCRIPTION OF THE INVENTION

This invention relates to the discovery that precipitating nickel hydroxide independent of leaching or dissolving elemental nickel improves the effectiveness of producing nickel hydroxide from elemental nickel. In particular, this process offers a better control of the product's properties, by precipitating the nickel hydroxide in a controlled distillation step. Nickel hydroxide's crystallographic properties have a strong influence on its ultimate electrochemical properties. If the nickel hydroxide is too crystalline, it will not function properly in battery applications.

Figure 1:
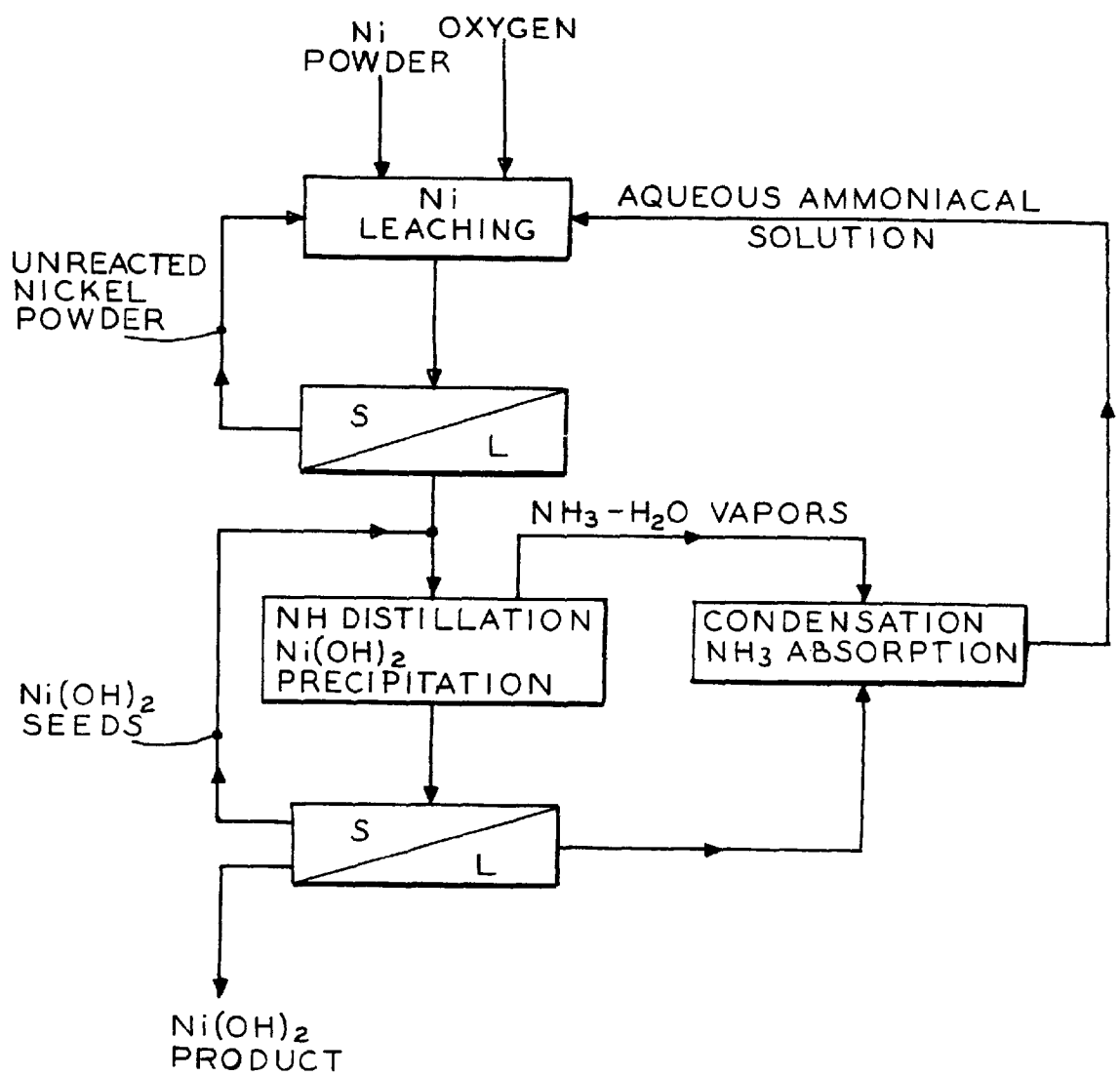
FIG. 1 is a schematic of the process of the invention leaching with an ammonia solution.

Referring to FIG. 1, the nickel powder leaches in an aqueous ammoniacal solution using oxygen gas as an oxidant. The aqueous ammoniacal solution contains free ammonia and may also contain a small amount of ammonium salt, such as sulfate, chloride, nitrate or acetate. The concentration of free ammonia could be within a wide range, but should be preferably over 4N in order to dissolve sufficient quantities of nickel into solution. A free ammonia concentration of at least 8N dissolves additional nickel. Most advantageously, the concentration is at least 12N for producing highly concentrated nickel solutions. Nickel powders of high surface area, e.g. 0.4 $m^2/g$ or higher, are particularly suitable as feed materials for this process. These powders typically originate from the thermal decomposition of nickel carbonyl. The ammonium salts concentration could be from 0 to 1N or higher, but preferably around 0.1N.

The leaching step operates advantageously at any temperature between 0° C. and the boiling point of the solution, which would depend on the concentration of free ammonia in the solution. A single agitated tank or tanks in series can carry out the nickel powder leaching at atmospheric pressure or with a slight oxygen over-pressure to accelerate the dissolution of nickel powder and eliminate any ammonia loss into the atmosphere. The leaching produces nickel and hydroxyl ions. The hydroxyl ions can raise the pH to levels above 13.

Elemental nickel powders can contain a difficult to dissolve passive film. For purposes of this specification, activated nickel means elemental nickel capable of dissolving in an ammonia-containing solution at atmospheric pressure in the presence of oxygen. First, contacting the nickel feed powder with recycled process solution in a separate agitating tank with the resulting suspension being fed into a reactor activates the nickel. Second, a separate solution of dilute or other acid can activate the nickel. Third, introducing the nickel directly into a reactor maintained at a redox-potential below about −200 mV, as measured with respect to a standard calomel electrode (SCE), activates the nickel. Finally, any suitable reducing agent such as hydrogen gas may reduce any passive oxygen film surrounding the nickel to effectively activate the nickel.

Subjecting the leached suspension to a solid/liquid separation (performed by any conventional method, such as gravity settling, filtration or by a magnetic force) removes the unreacted nickel powder. The clear leach liquor then mixes with nickel hydroxide seeds. And subjecting this aqueous ammonia mixture to distillation at either atmospheric or at reduced pressure precipitates the nickel hydroxide. As the ammonia evaporates from the solution, nickel hydroxide precipitates. Advantageously, seeding of the evaporator/precipitator vessel controls the morphology and particle size of the nickel hydroxide during precipitation. The addition of seeds, the rate of ammonia removal from the liquor and distillation temperature can dramatically affect final properties of the hydroxide. Reducing the time and temperature of distillation can further reduce crystallinity. Furthermore, it is advantageous to agitate the evaporator vessel to prevent nickel hydroxide from precipitating on the vessel's walls. After the ammonia distillation, solid/liquid separation divides the nickel hydroxide suspension from the spent solution.

The resulting liquor combines with the ammonia reactor condensate and recycles back to the leaching as illustrated in the flow diagram. Recycling of the aqueous ammoniacal solution provides a closed-loop process for producing nickel hydroxide without any by-products.

If battery performance requires, the process facilitates co-precipitating a total of up to about 15 weight percent additives, such as e.g. Ba, Ca, Cd, Co, Mn and Zn. Introducing these metals into the leach liquor or optionally into the evaporator/precipitator vessel produces the "doped" nickel hydroxide. Most advantageously, the nickel hydroxide contains up to 12 weight percent total cobalt and zinc co-precipitated in the hydroxide.

The following examples illustrate the invention:

Leaching of Elemental Nickel

Example 1

This test used a resin kettle filled with 1.9 L of an aqueous solution, containing 8 moles/L of free ammonia and 0.05 mole/L of ammonium sulfate. The resin kettle contained a 2 in. (5.1 cm) diameter radial turbine impeller, four baffles, an oxygen sparger, a condenser, a redox-potential electrode and a thermometer. This impeller agitated the solution at 1200 rpm and maintained the solution at room temperature under atmospheric pressure. All the examples of this specification relied upon this equipment. Introducing 32 g of Ni powder (INCO® powder type 255) into the agitated solution formed a liquid/solid mixture. (Inco is a trademark of the Inco family of companies.) When the redox-potential of the suspension decreased to approximately −700 mV as measured through a standard calomel electrode (SCE), oxygen flow (though a rotameter) at 30 mL/min. initiated the dissolution of nickel powder. The oxygen flow discontinued after about 6 h of oxygen sparring. Filtering the resulting suspension produced a filtrate that analyzed in (g/L): 14.5 Ni, 4.68 $SO_4$ and 131 $NH_3$.

Example 2

This test used the same ingredients as Example 1, except that the feed solution contained twice as much ammonium sulfate and small quantities of Co and Zn powders. Specifically, the solution contained 0.1 mole/L ammonium sulfate. The reactor contained 1.9 L of feed solution and the following quantities of metallic powders: 40.7 g Ni powder (INCO Type 255), 0.505 g Co powder (Afrimet) and 0.989 g Zn powder. The initial potential of the feed powder suspension was −902 mV with respect to a SCE. The oxygen flow was 15 mL/min. for 22 hours to leach the metal powders. The redox potential increased during this period to −166 mV (with respect to a SCE). Terminating the oxygen flow quickly ceased the leaching of the metals. After completing this leaching, the leach liquor filtrate analyzed 21 g/L Ni, 0.23 g/L Co and 0.53 g/L Zn.

$NH_3$ Distillation/$Ni(OH)_2$ Precipitation

Example 3

This test used the resin kettle of Example 1 filled with approximately 1.5 L of leach liquor. The leach liquor had originated from dissolving nickel $NI(OH)_2$, containing Co and Zn, in a 14 N aqueous ammonia solution (anion-free), analyzing 5.9 g/L dissolved nickel. The solution began to boil when the temperature reached 53° C. This distillation continued until the solution temperature reached 71° C. After distillation, filtering the suspension produced a filter cake. Washing the filter cake with water and drying it in an oven at 70° C. recovered 10.6 g of nickel hydroxide. This hydroxide analyzed 58.9% Ni, 0.24% Co and 2.75% Zn. The filtering also recovered 1.15 L of filtrate, containing 1.88 g/L Ni. Measuring crystallite size for the 001 and 101 planes and the full width half maximum (FWHM) of the 101 plane indicate crystallinity and predict battery performance. This product, produced without seeding, was very crystalline, as indicated below:

TABLE 1

| Plane | Crystallite size [Å] | | FWHM (degrees) |
|---|---|---|---|
| | 001 | 101 | 101 |
| | 859 | 417 | 0.28 |

The high crystallite sizes of the 001 and 101 planes indicate a highly crystalline structure. Furthermore, the narrow width of the 101 plane indicates high crystallinity.

Example 4

This test used the starting feed liquor of Example 3, except the kettle contained 4.25 g of $Ni(OH)_2$ seed at the beginning of the test. The test continued until the boiling temperature reached 75° C. The process produced 16.7 g of $Ni(OH)_2$, analyzing 60.1% Ni, 0.42% Co and 2.44% Zn, and 1.07 L of filtrate, analyzing 1.2 g/L Ni. This hydroxide was substantially less crystalline than that obtained in Example 3, as shown below:

TABLE 2

| Plane | Crystallite size [Å] | | FWHM (degrees) |
|---|---|---|---|
| | 001 | 101 | 101 |
| | 365 | 283 | 0.38 |

Example 5

This semi-batch test used 1.5 L of filtrate from Example 4 plus 20 g of $Ni(OH)_2$ seeds placed in the resin kettle. Heating this mixture to the boiling point, which was 82° C., initiated the distilling of the loaded solution. Then a leach liquor solution, containing 15.8 g/L Ni, 126 g/L of ammonia and 14.1 g/L sulfate fed into the boiling mixture at the rate of 5 mL/min. The boiling point decreased to 77° C.; and it maintained in the 77°–78° C. range until the end of the test. At the end of the test, approximately 1.5 L of the leach liquor was pumped into the kettle. This test produced a total of 31.7 g of $Ni(OH)_2$ product having the following crystallinity:

TABLE 3

| Plane | Crystallite size [Å] | | FWHM (degrees) |
|---|---|---|---|
| | 001 | 101 | 101 |
| | 121 | 156 | 0.63 |

The crystallinity of $Ni(OH)_2$ seeding material (expressed in terms of crystallite size) was as follows:

TABLE 4

| Plane | Crystallite size [Å] | | FWHM (degrees) |
|---|---|---|---|
| | 001 | 101 | 101 |
| | 238 | 239 | N/A |

The low crystallite size and wide 101 plane peak indicate this hydroxide has low crystallinity and good electrochemical performance.

This Example illustrates that seeding dramatically affects the crystallinity of the $Ni(OH)_2$ product. Running the process continuously, preferably at high rates, should also lower crystallinity of the nickel hydroxide.

Figure 2:
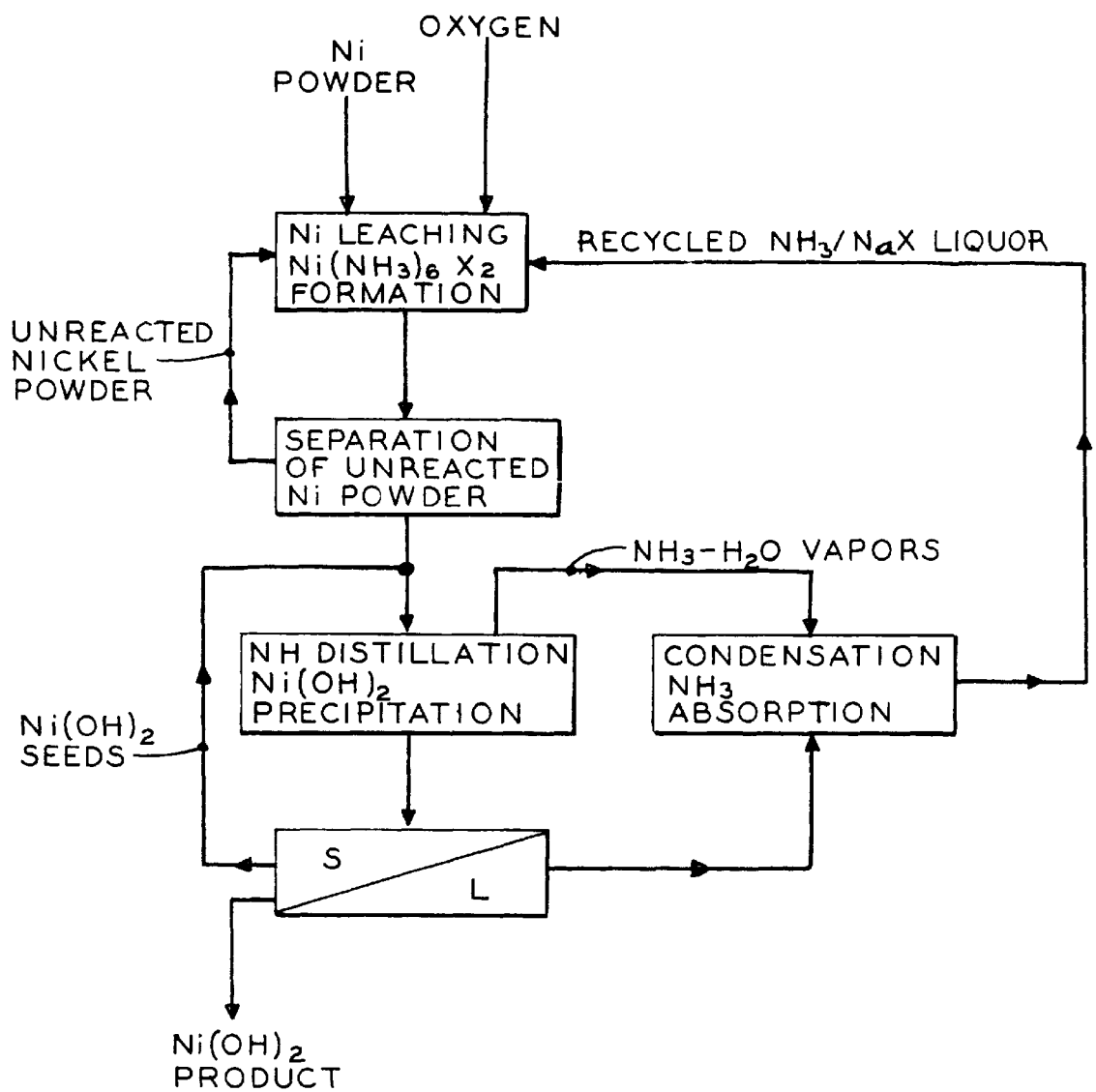
FIG. 2 is a schematic of the process of the invention leaching with an ammonia/alkali salt solution.

In the process of FIG. 2, nickel powder also reacts in a concentrated free ammonia solution using oxygen as an oxidant. This solution however, also contains an alkali metal salt. Most advantageously, the alkali metal salt is sodium or potassium. The presence of any alkali metal salt such as a sulfate, acetate, nitrate or chloride effectively aid in driving the nickel oxidation process at a low temperature, for example, 30° C. or below. Most advantageously, this solution has a free ammonia concentration of at least 10N to effectively dissolve the nickel. Nickel readily dissolves in this solution at atmospheric pressure or at a slight oxygen over-pressure.

After the solution reaches the saturation point it may precipitate in the form of a nickel-ammine salt, depending on the anion of the sodium salt used. For example, when using an ammonia/sodium chloride solution (i.e. chloride anion), the nickel precipitates as a purple-blue-nickel-ammine chloride (presumably nickel-hexammine chloride). The nickel in this step may precipitate as any type of nickel ammine. The chloride io n promotes precipitation of the nickel-hexammine. Most advantageously, chloride concentration ranges between 0.5 and 3N. If this process continues to the point of precipitating a nickel salt, this process must separate the nickel salt from the unreacted nickel. A gravity or magnetic method can readily separate the salt from the unreacted metal. The nickel-ammine precipitate settles slower than the nickel powder and consequently gravity separation devices can separate these particulate. Also since nickel powder is magnetic, a magnetic separator also readily separates the elemental nickel powder from the non-magnetic nickel salt. The separated nickel powder recycles back to the nickel leaching operation as shown in the flow diagram.

Subjecting the leach liquor and nickel-ammine salt in an ammonia distillation/$Ni(OH)_2$ precipitation operation produces an ammonia gas and precipitates nickel hydroxide. Basically, this operation as well as ammonia condensation/absorption are very similar to those described above, except the liquor recycles the alkali metal salt. Since this process essentially recycles all of its alkali metal salt, this process only requires initial adding of salt and the occasional supplementing of the solution.

Nickel powder leaching/Nickel-ammine salt formation

Example 6

This test used the resin kettle of Example L1 filled with 1.7 L of 8N $NH_3$–2N NaCl solution and 86 g of Ni powder (INCO Type 123 powder). The kettle contained a 2 in. (5.1 cm) diameter radial turbine impeller rotating at 1000 rpm. The impeller agitated the mixture at room temperature (23° C.). After agitating the suspension for about 30 min., the pH and the redox potential stabilized at 12.40 and −850 mV respectively. Starting oxygen flow through the sparger at 10 mL/min. initiated the reaction. The experiment continued until the potential increased to −190 mV. The pH at this point was 13.47. During the experiment, a purple-blue precipitate formed. After the test stopped, this precipitate settled slower than the unreacted Ni powder. Based on the mass and analysis of the unreacted Ni Powder 47.08 g of Ni reacted. The leach liquor suspension of nickel-ammine chloride contained 27.7 g/L total Ni, with 4.02 g/L Ni in this solution. A portion of the purple-blue precipitate dissolved in 140 mL of distilled water; and the resulting solution then analyzed to contain in (g/L): 23.8 Ni, 49 $NH_3$ and 32.1 Cl. This is equivalent to the formula $Ni(NH_3)_{7.1}(Cl)_{2\ldots3}$, suggesting this precipitate was nickel-hexammine chloride.

Example 7

This test used the conditions of Example 6, except the solution contained 8N $NH_3$, 2N sodium sulfate solution. But this process did not produce any observable nickel-ammine precipitate. The leach liquor analyzed 9.8 g/L of dissolved Ni.

Example 8

This test used the conditions of Example 6, except the solution contained 8N $NH_3$ and 2N sodium acetate. This process did not produce any observable nickel-ammine precipitate. The leach liquor analyzed 10.1 g/L of dissolved Ni.

This invention provides a pollution-free-closed-loop process for producing nickel hydroxide. Employing this pollution-free process (that only consumes oxygen) facilitates producing low-cost nickel hydroxide. In addition, this process allows direct control of the precipitation process. For example, the nature of the nickel hydroxide seeds, temperature and the rate of distillation together act to control the ultimate crystallinity of the nickel hydroxide. The control of the crystallinity allows optimizing of nickel hydroxide to maximize battery performance. Optionally, the process may introduce crystal modifying additives in the dissolution or precipitation steps to further increase battery performance.

In accordance with the provisions of the statute, this specification illustrates and describes specific embodiments of the invention. Those skilled in the art will understand that the claims cover changes in the form of the invention and that certain features of the invention may operate advantageously without a corresponding use of the other features.

We claim:

1. A method of producing nickel hydroxide from elemental nickel comprising the steps of:
   a) introducing elemental nickel into an aqueous solution to form a mixture, the aqueous solution containing at least 4N aqueous ammonia, and the elemental nickel of the mixture being activated for dissolution into the aqueous solution;
   b) adding oxygen to the aqueous solution to dissolve the elemental nickel in the aqueous ammonia solution to form a loaded solution containing nickel and hydroxyl ions, and the aqueous solution having a reducing potential during the dissolving of the elemental nickel;
   c) distilling the loaded solution to precipitate nickel hydroxide and to vaporize the aqueous ammonia solution; and
   d) recycling the vaporized aqueous ammonia solution to dissolve additional quantities of the elemental nickel.

2. The method of claim 1 wherein the distilling precipitates nickel hydroxide on nickel hydroxide seeds.

3. The method of claim 1 including the additional step of filtering the nickel hydroxide from aqueous ammonia solution remaining after the distilling of the loaded solution.

4. The method of claim 1 wherein the aqueous solution contains a dissolved alkali metal salt.

5. The method of claim 4 including the steps of precipitating a nickel ammine in the aqueous solution and introducing a mixture of the loaded aqueous solution and the nickel ammine into a vessel for said distilling.

6. The method of claim 5 wherein the alkali metal salt is sodium chloride.

7. The method of claim 1 including the step of adding at least one additive to the aqueous solution, the additive being selected from the group consisting of Ba, Ca, Cd, Co, Mn and Zn and wherein the distilling co-precipitates a total of up to about 15 weight percent of the additive.

8. The method of claim 1 wherein nickel dissolves in an aqueous solution having a free ammonia concentration of at least 8N and an ammonia salt concentration between 0 and 1N.

9. The method of claim 7 wherein the distilling of the nickel-containing solution includes co-precipitating up to about 12 weight percent total cobalt and zinc.

10. A method of producing nickel hydroxide from elemental nickel comprising the steps of:
    a) introducing elemental nickel into an aqueous solution to form a mixture, the aqueous solution containing at least 8N aqueous ammonia, and the elemental nickel of the mixture being activated for dissolution into the aqueous solution;
    b) adding oxygen to the aqueous solution to dissolve the elemental nickel in the aqueous ammonia solution to form a loaded solution containing nickel and hydroxyl ions, and the aqueous solution having a reducing potential during the dissolving of the elemental nickel;
    c) distilling the loaded solution to precipitate nickel hydroxide and to vaporize the aqueous ammonia solution;
    d) filtering the nickel hydroxide from aqueous ammonia solution remaining after the distilling of the loaded solution; and
    e) recycling the vaporized and filtered aqueous ammonia solution to dissolve additional quantities of the elemental nickel.

11. The method of claim 10 wherein the distilling precipitates nickel hydroxide on nickel hydroxide seeds.

12. The method of claim 10 wherein the aqueous solution contains a dissolved alkali metal salt.

13. The method of claim 12 including the additional steps of precipitating a nickel hexammine in the aqueous solution and introducing a mixture of the loaded solution and the nickel hexammine into a vessel for said distilling.

14. The method of claim 13 wherein the alkali metal salt is sodium chloride.

15. The method of claim 10 including the step of adding at least one additive to the aqueous solution, the additive being selected from the group consisting of Ba, Ca, Cd, Co, Mn and Zn and wherein the distilling co-precipitates a total of up to about 15 weight percent of the additive.

16. The method of claim 10 wherein nickel dissolves in an aqueous solution having a free ammonia concentration of at least 8N and an ammonia salt concentration between 0 and 1N.

17. The method of claim 15 wherein the distilling of the nickel-containing solution includes co-precipitating up to about 12 weight percent total cobalt and zinc.

* * * * *